(12) United States Patent
Lang et al.

(10) Patent No.: US 11,489,410 B2
(45) Date of Patent: Nov. 1, 2022

(54) SHAFT FOR AN ELECTRIC MACHINE

(71) Applicant: ZF Friedrichshafen AG, Friedrichshafen (DE)

(72) Inventors: Martin Lang, Wegscheid (DE); Thomas Auer, Passau (DE); Sebastian Paulik, Tiefenbach (DE); Harald Wendl, Vilshofen (DE); Gerhard Obermaier, Tiefenbach (DE); Maria Lang, Hauzenberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 31 days.

(21) Appl. No.: 16/895,014

(22) Filed: Jun. 8, 2020

(65) Prior Publication Data

US 2020/0389073 A1 Dec. 10, 2020

(30) Foreign Application Priority Data

Jun. 6, 2019 (DE) ...................... 10 2019 208 293.9

(51) Int. Cl.
*H02K 9/193* (2006.01)
*H02K 7/00* (2006.01)

(52) U.S. Cl.
CPC ............. *H02K 9/193* (2013.01); *H02K 7/003* (2013.01)

(58) Field of Classification Search
CPC ................................ H02K 9/193; H02K 7/003
USPC ................................ 310/52, 54, 64, 216.122
See application file for complete search history.

(56) References Cited

U.S. PATENT DOCUMENTS

| | | | |
|---|---|---|---|
| 2011/0273043 A1* | 11/2011 | Raad | H02K 7/003 310/83 |
| 2011/0298314 A1 | 12/2011 | Atarashi et al. | |
| 2012/0299404 A1* | 11/2012 | Yamamoto | H02K 1/32 310/61 |

(Continued)

FOREIGN PATENT DOCUMENTS

| | | |
|---|---|---|
| DE | 102006047186 A1 | 4/2008 |
| DE | 102012102798 A1 | 10/2013 |

(Continued)

OTHER PUBLICATIONS

German Search Report DE102019208293.9, dated Feb. 19, 2020. (14 pages).

(Continued)

*Primary Examiner* — Jose A Gonzalez Quinones
(74) *Attorney, Agent, or Firm* — Dority & Manning, P.A.

(57) ABSTRACT

A shaft (12) for cooling an electric machine (10) includes: an outer sub-shaft (32), which is designed for being rotationally fixed to a rotor (14) of the electric machine; an inner sub-shaft (30), which is rotationally fixed to the outer sub-shaft and is designed as an output shaft of the electric machine; an inflow (36) arranged in the radial direction between the outer sub-shaft and the inner sub-shaft, in order to supply cooling fluid (28) to the shaft; and an outflow (42) arranged in the radial direction between the outer sub-shaft and the inner sub-shaft, in order to discharge cooling fluid supplied to the shaft. The outer sub-shaft encloses a fluid chamber (40), which is arranged in the axial direction between the inflow and the outflow. A direction of flow of cooling fluid in the fluid chamber is established by a delivery direction of a fluid pump (24).

13 Claims, 4 Drawing Sheets

(56) References Cited

U.S. PATENT DOCUMENTS

2016/0352186 A1   12/2016   Faistauer et al.

FOREIGN PATENT DOCUMENTS

| DE | 102014202056 A1 | | 9/2015 | | |
|---|---|---|---|---|---|
| DE | 102016216479 A1 | | 3/2018 | | |
| DE | 102017214560 A1 | | 2/2019 | | |
| EP | 2109206 A1 | * | 10/2009 | ............... | H02K 1/20 |
| EP | 2846439 | | 3/2015 | | |
| JP | 2000005902 A | * | 1/2000 | | |
| WO | WO 2008/040781 | | 4/2008 | | |
| WO | WO 2013/143809 | | 10/2013 | | |
| WO | WO-2014016100 A2 | * | 1/2014 | ........... | H02K 11/215 |
| WO | WO 2018/050380 | | 3/2018 | | |
| WO | WO-2020069744 A1 | * | 4/2020 | ............. | H02K 7/116 |

OTHER PUBLICATIONS

Kampker, Achim: Elektromobilproduktion. Aachen : Springer-Vieweg, 2014. S. 169-170.—ISBN 978-3-642-42021-4.

* cited by examiner

SHAFT FOR AN ELECTRIC MACHINE

CROSS-REFERENCE TO RELATED APPLICATION

The present application is related and has right of priority to German Patent Application No. 10 2019 208 293.9 filed on Jun. 6, 2019, which is incorporated by reference in its entirety for all purposes.

FIELD OF THE INVENTION

The present invention relates generally to a shaft for an electric machine, an electric machine, and a system for cooling an electric machine.

BACKGROUND

Vehicles are increasingly equipped with hybrid drives or pure electric drives. Hybrid drives can contribute to the reduction of fuel consumption and pollutant emissions. Drive trains including an internal combustion engine and one or multiple electric motors have largely prevailed as a parallel hybrid or as a mixed hybrid. Since the drive torques of the electric drive and of the internal combustion engine can add up, depending on the actuation, a comparatively smaller design of the internal combustion engine and/or intermittent shut-down of the internal combustion engine is possible. As a result, a significant reduction of the CO2 emissions can be achieved without significant losses of power and/or comfort. Pure electric vehicles can be operated, at times, without significant emissions.

In particular during the utilization of electric machines that can reach very high rotational speeds, for example, in the range of twenty thousand (20,000) revolutions per minute, the components of the electric machines are exposed to enormous loads and high temperatures. It is therefore known to limit the energy supplied to an electric machine, in order to prevent excessive heating and associated damage of the electric machine. As a result, however, the electric machine cannot reach full potential.

Moreover, it is known to cool the electric machine with the aid of cooling fins arranged on a housing of the electric machine or with the aid of a water cooling arranged on the housing. These types of coolings are not very efficient, since the cooling takes place at a great distance from the heat source.

WO 2018/050380 A1 describes a machine including a hollow shaft, which is supported in bearings, so that the hollow shaft is rotatable about an axis of rotation. A cooling medium flows through the hollow shaft during the operation of the machine. The hollow shaft is adjacent, at one axial end, to a clutch part in an axially and/or radially outward medium-tight manner. Via the clutch part, cooling medium is fed into the hollow shaft and/or discharged from the hollow shaft. A supporting element, which protrudes into the hollow shaft and is surrounded by the cooling medium, is arranged at the clutch part in a rotationally fixed manner and centered in relation to the axis of rotation. A sensor element is arranged on the supporting element, centered in relation to the axis of rotation. On the inside of the hollow shaft, a material measure is rotationally fixed to the hollow shaft. The material measure and the sensor element cooperate in such a way that the rotation position of the hollow shaft and/or the change of the rotation position of the hollow shaft can be determined on the basis of the signals output by the sensor element. It is disadvantageous that the hollow shaft functions as an output shaft of the electric machine. Therefore, the hollow shaft must have an appropriately great wall thickness, which makes the cooling of the electric machine via the hollow shaft less efficient. Moreover, a connection of the hollow shaft to a mechanism and an organizing of the fluid circuit is highly technically complex.

In general, it is desirable to cool an electric machine as efficiently as possible, in order to minimize a limitation of the energy supplied to the electrical machine. A limitation of the supplied energy is associated with a loss in the efficiency of the electric machine. Various operating modes are provided, particularly in the case of electric machines for motor vehicles. For example, the electric machine can be operated in a recuperation mode. In this mode, a low efficiency of the electric machine results in a loss in the energy recuperation. Therefore, a portion of the practically freely available energy cannot be recuperated and utilized. It is therefore of particular interest to increase the efficiency of an electric machine, in particular of an electric machine for a motor vehicle.

SUMMARY OF THE INVENTION

A problem addressed by example aspects of the present invention is that of creating a possibility for improving the cooling of an electric machine. In particular, a device is provided, which allows for a cooling at a close distance to the heat source.

In order to solve this problem, example aspects of the invention provide a shaft for an electric machine, including:
an outer sub-shaft, which is designed for being rotationally fixed to a rotor of the electric machine;
an inner sub-shaft, which is rotationally fixed to the outer sub-shaft and is designed as an output shaft of the electric machine;
an inflow arranged in the radial direction between the outer sub-shaft and the inner sub-shaft, in order to supply cooling fluid to the shaft; and
an outflow arranged in the radial direction between the outer sub-shaft and the inner sub-shaft, in order to discharge cooling fluid supplied to the shaft; wherein the outer sub-shaft encloses a fluid chamber, which is arranged in the axial direction between the inflow and the outflow;
wherein the fluid chamber is designed for accommodating the cooling fluid, in order to cool the shaft; and
wherein a direction of flow of the cooling fluid in the fluid chamber is established by a delivery direction of a fluid pump.

Example aspects of the invention further relate to an electric machine, including:
a stator;
a rotor; and
a shaft as described above, wherein the shaft is rotationally fixed to the rotor of the electric machine.

Moreover, example aspects of the invention relate to a system for cooling an electric machine, preferably an above-defined electric machine, including:
a fluid sump for storing the fluid; and
a fluid pump for delivering the cooling fluid from the fluid sump to the electric machine, in order to form a cooling circuit.

It is understood that the features, which are mentioned above and which will be described in greater detail the following, are usable not only in the particular combination indicated, but also in other combinations or alone, without departing from the scope of the present invention. Moreover, it is understood that the features and advantages mentioned here can be utilized with any electric machine, regardless of their intended purpose.

By providing a shaft for an electric machine including an outer sub-shaft and an inner sub-shaft, wherein the outer sub-shaft encloses a fluid chamber, a fluid chamber for cooling the electric machine can be made available in the interior of the electric machine. Heat can be dissipated directly out of the interior of the electric machine. The cooling of the electric machine is possible in a technically simple and efficient manner. By providing the inner sub-shaft as an output shaft of the electric machine, further components can be dispensed with. The electric machine can be produced in a technically simple manner with few components. By predefining or establishing a direction of flow of a cooling fluid in the fluid chamber with the aid of a delivery direction of a fluid pump, a cooling circuit can be created. During the operation of the electric machine, cooling fluid located in the fluid chamber is pressed radially outward against an inner wall of the outer sub-shaft due to the centrifugal force, and so a large surface in the interior of the fluid chamber is covered with cooling fluid. In so doing, the cooling is further improved.

In one preferred example embodiment, the outer sub-shaft includes a connecting section, which is designed for rotationally fixing the outer sub-shaft to the inner sub-shaft. The inflow includes a duct, a through-cut, and/or a bore hole in the connecting section. Due to an inflow in the form of a duct, a through-cut, and/or a bore hole in a connecting section, the inflow can be implemented in a technically simple manner. No further components are necessary in order to supply the shaft with cooling fluid. Due to the provision of a connecting section, which is designed for rotationally fixing the outer sub-shaft to the inner sub-shaft, the shaft can be designed with few components.

In one advantageous example embodiment, the connecting section includes a driving toothing, in order to rotationally fix the inner sub-shaft and the outer sub-shaft to each other. As a result, a rotationally fixed connection between the inner sub-shaft and the outer sub-shaft can be created in a cost-effective manner. Moreover, a production of the shaft is simplified, since the inner sub-shaft can be easily inserted or pressed into the outer sub-shaft, in order to form the shaft.

In one advantageous example embodiment, the outflow is formed by a gap between the outer sub-shaft and the inner sub-shaft. As a result, an outflow of the warm cooling fluid out of the fluid chamber can be implemented in a technically simple way. Moreover, as a result, there is preferably no fixed connection between the inner sub-shaft and the outer sub-shaft in the area of the outflow, whereby the inner sub-shaft can retract in an improved manner, in order, for example, to compensate for play in a mechanism connected to the shaft.

In one preferred example embodiment, the inner sub-shaft includes, in the area of the outflow, a support ridge for supporting the inner sub-shaft at the outer sub-shaft. As a result, an essentially rigid shaft can be created. In particular, a supporting of the inner sub-shaft and a simultaneous outflow of heated cooling fluid can be achieved in a technically simple way.

In one preferred example embodiment, the outflow opens in a feed line to a fluid sump. In this way, a cooling circuit can be created in a technically simple way. Moreover, heated and moving fluid can settle in a fluid sump. Bubbles that may have formed in the cooling fluid can travel upward due to the lower density of the bubbles. When the cooling fluid is drawn out of the fluid sump again, with the aid of a fluid pump, and when cooling takes place again, less hydraulic drag and a high cooling power are possible.

In one further advantageous example embodiment, an end section of the inner sub-shaft protrudes axially farther than the outer sub-shaft, in order to form the output shaft of the electric machine. In this way, a cooling as well as a connection to a mechanism can be achieved in a technically simple manner with only one component. The shaft can be utilized instead of an output shaft, known from the prior art, for an electric machine.

In one advantageous example embodiment, the end section is designed for being connected to a mechanism and/or itself forms a part of the mechanism. In this way, the shaft can be operatively connected to a mechanism without further fixtures.

In one advantageous example embodiment, the outer sub-shaft is provided in two parts. The two parts are connected in a fluid-tight manner with the aid of a press fit, friction welding, and/or bonding. In this way, the production of the outer sub-shaft is possible in a technically simple way. Moreover, it can be ensured that no fluid enters a rotor of the electric machine through the connection of the two parts.

In one advantageous example embodiment of the electric machine, the electric machine includes a transmitter wheel. The transmitter wheel is designed for rotating with the shaft and includes a bore hole, in order to supply cooling fluid to the shaft through the transmitter wheel. In this way, a monitoring of the rotational speed and the direction of rotation of the electric machine is possible in a technically simple and reliable manner, wherein a supply of cooling fluid to the shaft of the electric machine is ensured.

In one further advantageous example embodiment of the electric machine, the outer sub-shaft is rotationally fixed to the rotor of the electric machine with the aid of a press fit. In this way, a rotationally fixed connection of the shaft to the rotor of the electric machine can be created in a cost-effective manner.

In one further advantageous example embodiment of the electric machine, the electric machine is designed for being operatively connected at the shaft to a transmission. The outflow is designed for supplying cooling fluid to the transmission, in order to lubricate and/or cool the transmission. In this way, the operatively connected transmission can be cooled and lubricated in a technically simple manner. Preferably, an additional lubrication and cooling of the transmission can be dispensed with.

In one advantageous example embodiment, the system for cooling the electric machine includes a heat exchanger, in order to withdraw or reject heat from the cooling fluid. The heat exchanger is preferably arranged between the fluid sump and the fluid pump in the direction of fluid flow. In this way, the cooling of the electric machine can be further improved. Additionally, heat can be withdrawn from the cooling fluid.

Cooling fluid is available in many different compositions, depending on the location and the field of application. For example, a mineral oil and/or synthetic oil with or without additives can be utilized. It is also conceivable to utilize water, in particular deionized water, with or without additives. Alcohols or ethers, with or without additives, can also be utilized as cooling fluid. In principle, any gas or any liquid, depending on the intended purpose, can be utilized as cooling fluid. In the present case, a substance that is liquid and/or flowable over the entire temperature range is usable as cooling fluid.

Recuperation is a recuperation of energy during a braking procedure. A recuperation brake, which is also referred to as a regenerative brake, operates in a wear-free manner, as is the case for any electrodynamic brake. The braking effect arises in that the drive motors are operated as electric generators. The electrical energy can be stored in the vehicle, for example, in an accumulator or a supercapacitor.

A transmitter wheel is a device for generating a signal that correlates with the angle position or rotational position of the transmitter wheel. For example, an angle or a rotational speed signal can be generated on the basis of periodic gaps in a gear ring or with the aid of an induction-type pulse generator due to the magnetic field changes. A uniform tooth structure corresponds to a sinusoidal voltage profile. Moreover, a certain gearwheel position can be transmitted to a control unit, in that different sized gaps are utilized at certain distances, whereby a change of the voltage profile takes place. An optical determination of the angle position or the rotational speed is also conceivable, for example, with the aid of teeth of a gearwheel, which pass through a light barrier.

Churning losses are efficiency losses, which result in adverse effects on the cooling properties of a cooling fluid that arise due to impurities, preferably due to air bubbles. The impurities usually have poorer thermal properties than the cooling fluid, and therefore a contaminated cooling fluid can absorb less heat. Moreover, in the case of a contamination of the cooling fluid via an inclusion of air, the viscosity of the cooling fluid can change, and therefore a fluid pump operates less efficiently.

BRIEF DESCRIPTION OF THE DRAWINGS

Example aspects of the invention are described and explained in greater detail in the following with reference to a few selected exemplary embodiments in conjunction with the attached drawings. Wherein.

DETAILED DESCRIPTION

Figure 1:
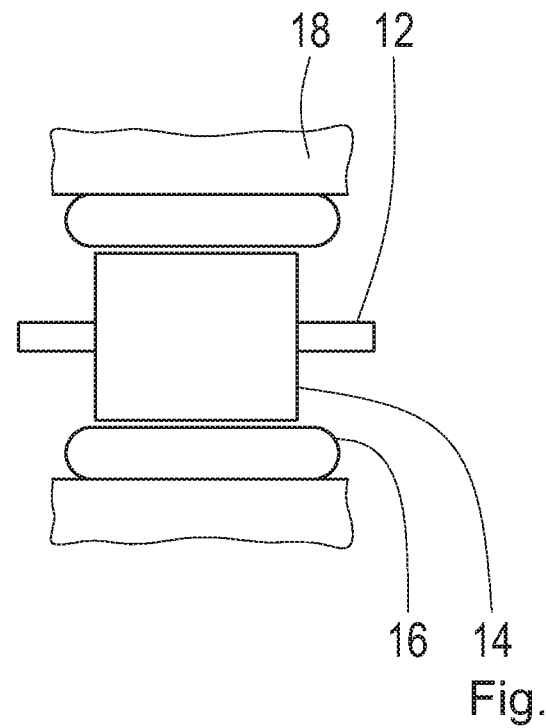
FIG. 1 shows a schematic of an electric machine including a shaft according to example aspects of the present invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

An electric machine 10 is diagrammatically shown in FIG. 1. The electric machine 10 includes a shaft 12, which is rotationally fixed to a rotor 14 of the electric machine. A stator 16 of the electric machine 10 is rotationally fixed to a housing 18. It is understood that the stator 16 can also be operatively connected to another component that prevents a turning motion of the stator 16 in relation to the rotor 14. The representation is to be understood as an example; the components are not true to scale. Moreover, a representation of further details has been dispensed with.

During an operation of the electric machine 10, the rotor 14 and the shaft 12 rotate at the same rotational speed. The stator 16 is connected to the housing 18 in such a way that the stator 16 essentially does not move, in particular does not turn. The electric machine 10 can be a direct-current machine, an alternating-current machine, or a three-phase alternating-current machine. In general, the invention can be used with any electric machine that includes an output shaft.

Figure 2:
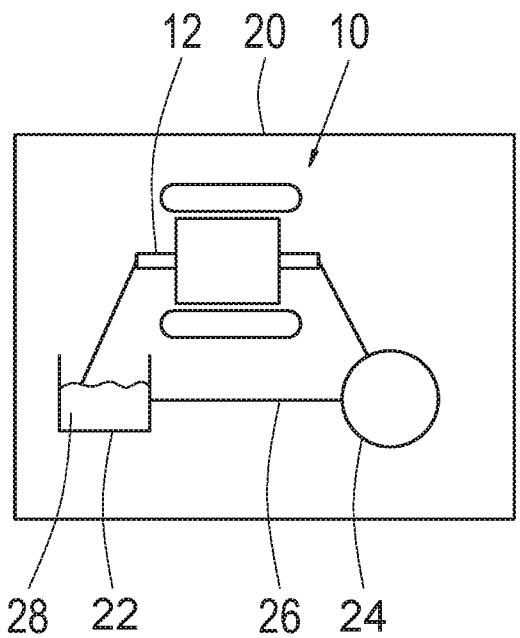
FIG. 2 shows a schematic of a cooling system according to example aspects of the present invention.

A system 20 for cooling the electric machine 10 is diagrammatically shown in FIG. 2. The system 20 includes a fluid sump 22, a fluid pump 24, and lines 26.

The fluid pump 24 delivers cooling fluid 28 out of the fluid sump into the shaft 12 of the electric machine 10. The cooling fluid 28 absorbs heat from the electric machine 10. Due to a further delivery of cooling fluid 28, the cooling fluid 28 located in the shaft 12 is displaced out of the shaft 12 of the electric machine 10 and flows back into the fluid sump 22.

The fluid pump 24 can be any type of pump that is suitable for delivering cooling fluid. It is understood that one or multiple heat exchangers can be provided in the system 20, in order to cool the cooling fluid 28 in an improved way. In addition, a fluid filter can be provided, in order to filter suspended matter out of the cooling fluid 28. In addition, one or multiple temperature sensors can be provided, in order to measure the temperature of the electric machine 10 and/or the cooling fluid 28. It is conceivable to control, by way of a closed-loop system, the fluid pump 24 depending on the temperature of the electric machine 10 and/or the cooling fluid 28. The representation is to be understood as an operable minimal diagram. Moreover, it is also conceivable that the fluid pump 24 operates one further cooling circuit.

Figure 3:
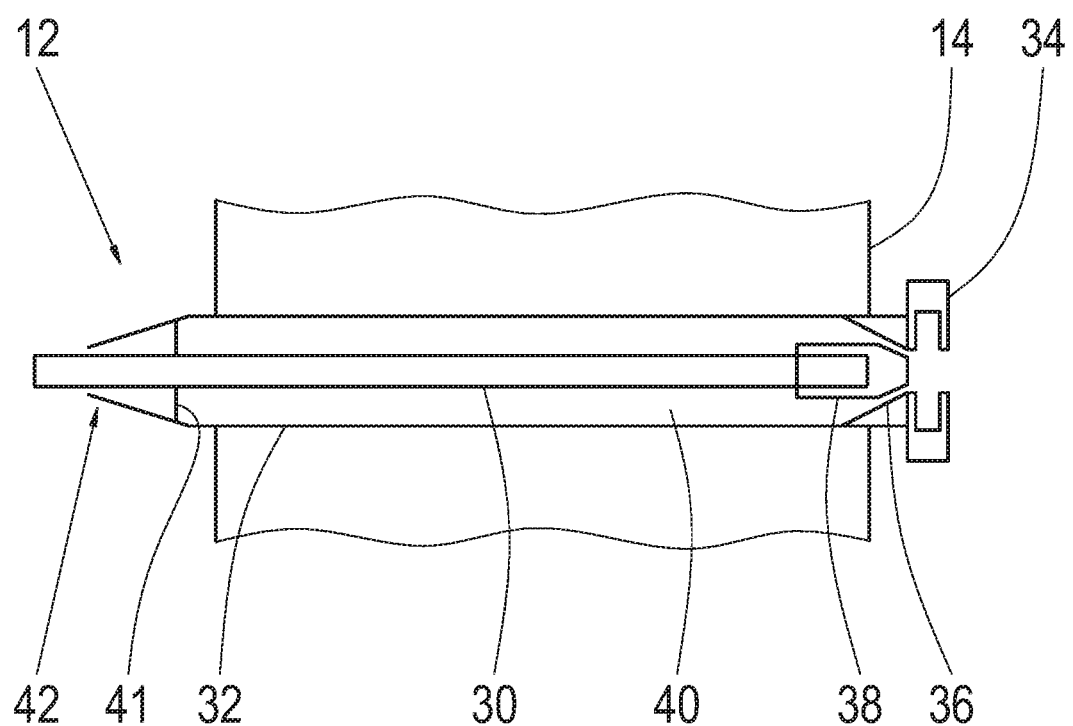
FIG. 3 shows a detailed schematic of the shaft of the electric machine.

A detailed view of the shaft 12 of the electric machine 10 is diagrammatically shown in FIG. 3. The shaft 12 includes a first radially internal, inner sub-shaft 30, which is designed as a solid shaft in the example shown. Moreover, the shaft 12 includes a second, radially external, outer sub-shaft 32, which is designed as a hollow shaft and encloses the inner sub-shaft 30.

A transmitter wheel 34 is arranged at the shaft, in order to determine the rotational speed of the shaft 12 and, therefore, of the rotor 14 of the electric machine 10. The transmitter wheel 34 includes a recess, in order to supply fluid, via the transmitter wheel 34, to the fluid chamber 40 through an inflow 36 in the form of a duct that is located in a connecting section 38. An outflow 42 is formed in the form of a gap between the inner sub-shaft 30 and the outer sub-shaft 32. Depending on the application, a support ridge 41 can also be provided in the area of the outflow 42, in order to support the outer sub-shaft 32 at the inner sub-shaft 30. The connecting section 38 is designed for connecting the inner sub-shaft 30 and the outer sub-shaft 32 to each other in a rotationally fixed manner. For this purpose, the connecting section 38 can include a driving toothing. It is also conceivable to weld or bond the two sub-shafts 30, 32 to each other. A press fit is also conceivable.

Figure 4:
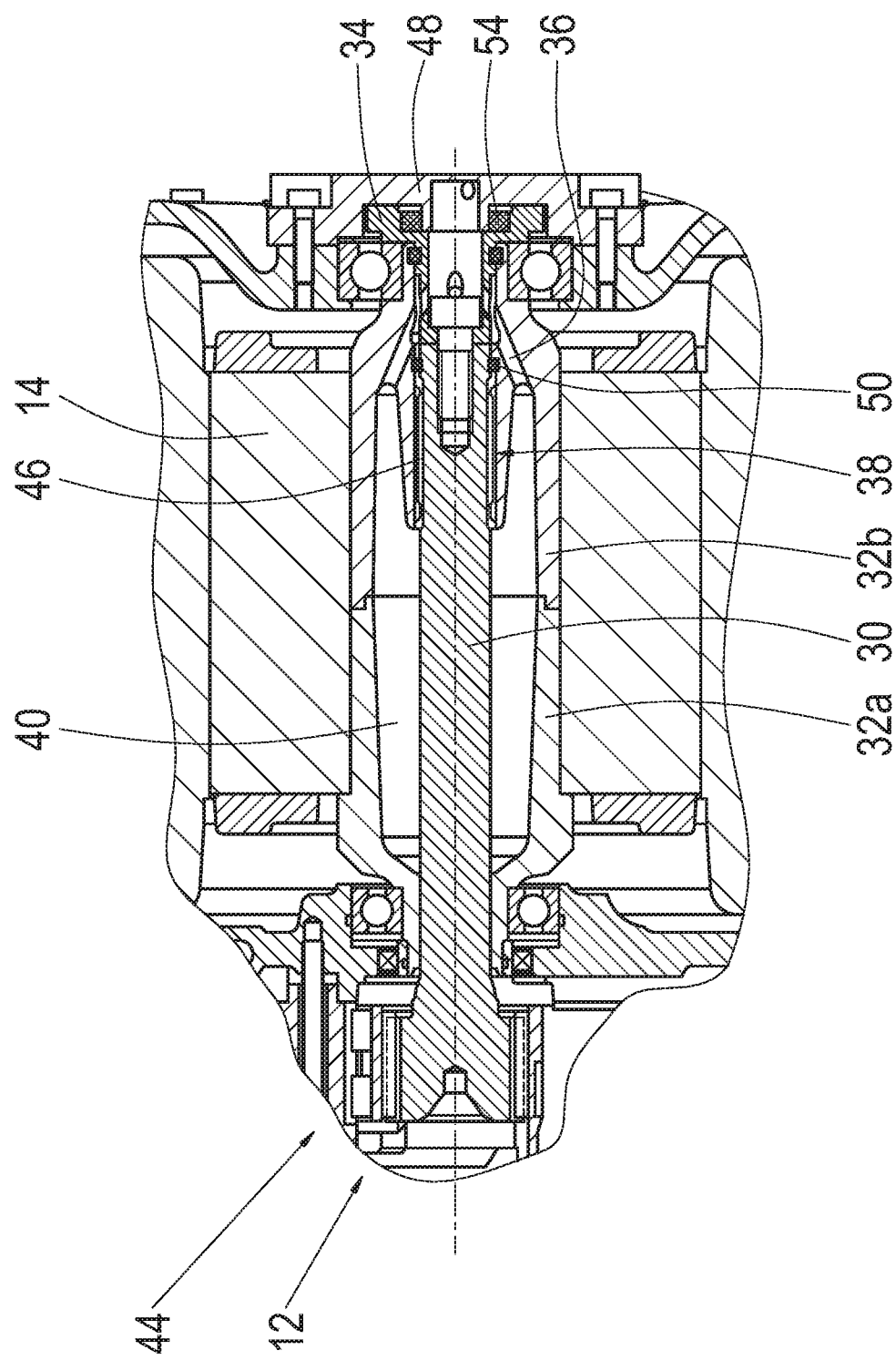
FIG. 4 shows a technical drawing of an electric machine including a shaft.

FIG. 4 diagrammatically shows a detailed technical drawing of a section of an electric machine 10 including a shaft 12. Identical reference numbers refer to identical features and are not explained again. FIG. 4 is a section drawing.

In the example shown, the shaft 12 includes, on an outflow side of the shaft 12, a mechanism in the form of a transmission 44. The radially external sub-shaft is formed by a first part 32a and a second part 32b. Moreover, the shaft 12 includes, at the connecting section 38, a driving toothing 46, in order to connect the outer sub-shaft 32 to the inner sub-shaft 30 in a rotationally fixed manner. The two parts 32a, 32b are connected to each other in a fluid-tight manner with the aid of friction welding.

If the electric machine 10 and, in particular, the shaft 12, are connected to a fluid circuit, cooling fluid 28 is scavenged out of the fluid sump 22 by the fluid pump 24. The fluid pump 24 delivers the cooling fluid 28 through the lines 26 and hydraulic screw connections into the shaft 12. A seal, for example, a radial shaft seal or a combination of a sealing ring and a baffle plate, is located between the transmitter wheel 34, which rotates with the inner sub-shaft 30 and the outer sub-shaft 32 and the rotor 14 of the electric machine 10, and a bearing cover 48.

The cooling fluid 28 flows through bore holes in the bearing cover 48 into the interior, i.e., into the recess of the transmitter wheel 34. From there, the cooling fluid 28 is delivered, via multiple inflows 36 in the form of bore holes in the transmitter wheel 34, into the shaft 12 and is accommodated in the fluid chamber 40.

In order to ensure that the cooling fluid 28 does not flow further through a gap between the inner sub-shaft 30 and the outer sub-shaft 32, shaft seals 50 seal off this gap, wherein the shaft seal 50 arranged at the connecting section 38 also seals with respect to a grease-lubricated bearing and/or with respect to a chamber of the electric machine. The shaft seal 50 can be designed, preferably, as an O-ring, wherein the O-ring generally seals off parts having the same rotational speed or rigid parts with respect to one another. By comparison, the shaft seal 54 can be, for example, a radial shaft sealing ring or a combination of a sealing ring and a baffle plate, wherein the shaft seal 54 seals off parts with respect to one another that have different rotational speeds. Therefore, the cooling fluid 28 flows into the fluid chamber 40 and, preferably, close to the outer sub-shaft 32. As a result, the cooling fluid 28 comes close to the rotor 14 of the electric machine 10. A good cooling power is achieved. The cooling power is supported via centrifugal force (rotation of the shaft 12), wherein the cooling fluid 28 in the fluid chamber 40 is brought against the walls of the outer sub-shaft 32 and absorbs heat from the rotor 14 of the electric machine 10. The outer sub-shaft 32 is provided in two parts, wherein the two parts 32a and 32b are connected to one another in a fluid-tight manner. This can take place, for example, via friction welding or a press fit.

The fluid chamber 40 of the shaft 12 can be forged already into the shaft 12, but can also be formed using a boring machining operation. The outer sub-shaft 32, onto which the rotor 14 of the electric machine 10 is mounted, preferably includes a large contact surface facing the rotor 14 of the electric machine 10, in order to achieve an elevated thermal conductivity from the electric machine 10 into the outer sub-shaft 32, wherein this heat is finally given off to the cooling fluid 28. Since the fluid chamber 40 of the shaft 12 is closed, the cooling fluid 28 enters the outflow 42 in the form of a gap between the inner sub-shaft 30 and the outer sub-shaft 32 and, from there, back into the fluid sump 22.

Figure 5:
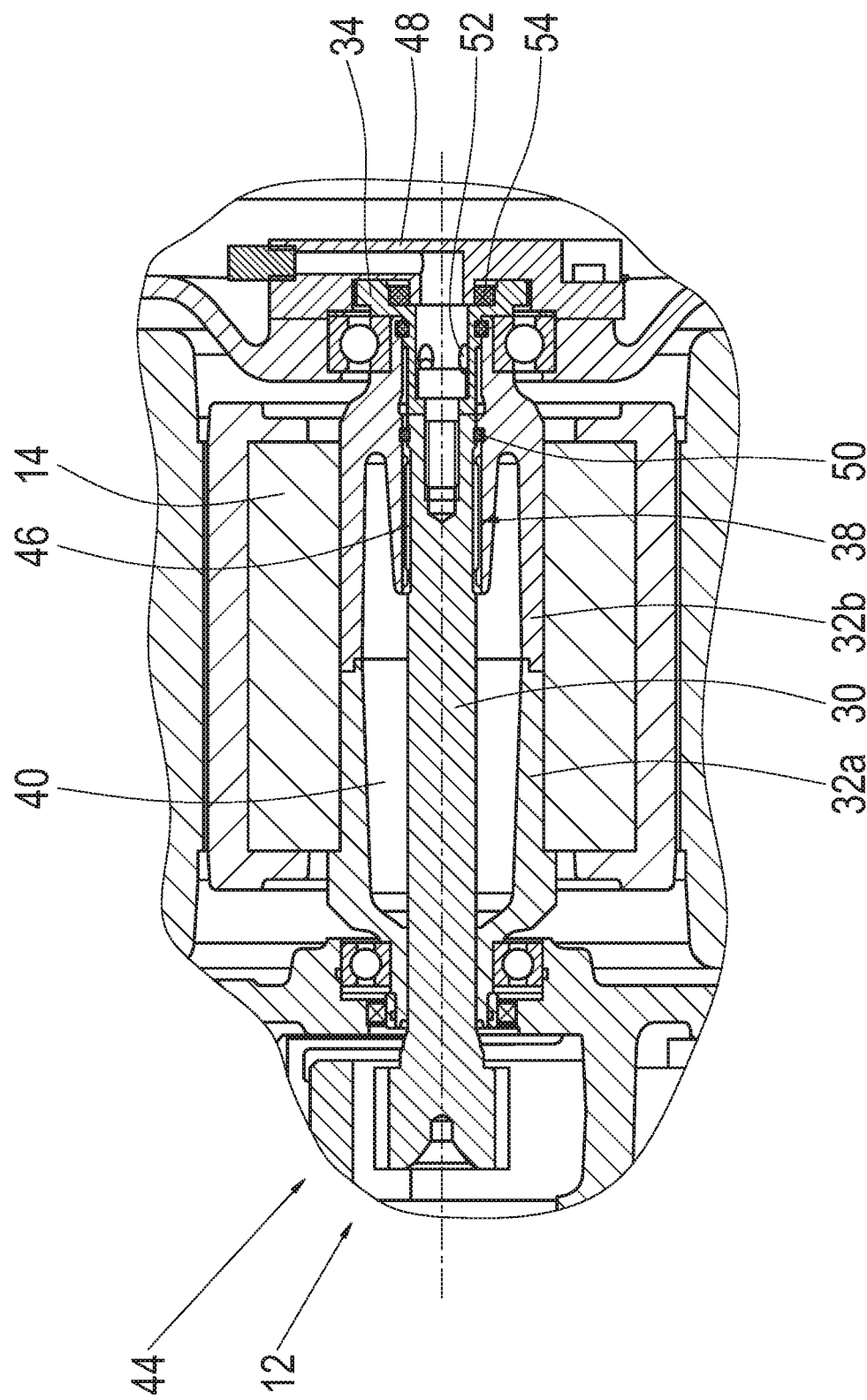
FIG. 5 shows one further technical drawing of the electric machine including a shaft.

FIG. 5 shows a technical drawing of an electric machine 10 including a shaft 12 according to example aspects of the present invention. Identical reference numbers refer to identical features and, therefore, are not explained again.

FIG. 5 is a section drawing, in which the shaft 12 and, therefore, also the rotor 14 of the electric machine 10 have been turned about the axis as compared to the section shown in FIG. 4. The inflow 36 is not shown in the section of FIG. 5. In addition, the representation of further details in the bearing cover 48 and in the transmission 44 is dispensed with. Bore holes 52 are shown in the transmitter wheel 34, which allow for a flow of cooling fluid 28 through the transmitter wheel 34 into the inflow 36 in the connecting section 38. The inflow 36 is not shown in this rotational position of the rotor 14, the shaft 12, and the transmitter wheel 34.

The invention was comprehensively described and explained with reference to the drawings and the description. The description and the explanation are to be understood as an example and are not to be understood as limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. The mere mention of a few measures in multiple various dependent claims is not to be understood to mean that a combination of these measures cannot also be advantageously utilized. Reference numbers in the claims are not to be understood as limiting. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 10 electric machine
12 shaft
14 rotor
16 stator
18 housing
20 system
22 fluid sump
24 fluid pump
26 line
28 cooling fluid
30 inner sub-shaft
32 outer sub-shaft
34 transmitter wheel
36 inflow
38 connecting section
40 fluid chamber
41 support ridge
42 outflow
44 transmission
46 driving toothing
48 bearing cover
50 shaft seal
52 bore hole in the transmitter wheel
54 seal

The invention claimed is:

1. A shaft (12) for an electric machine (10), comprising:
an outer sub-shaft (32) configured to be rotationally fixed to a rotor (14) of the electric machine; and
an inner sub-shaft (30) rotationally fixed to the outer sub-shaft and configured as an output shaft of the electric machine, wherein an inflow (36) is arranged in a radial direction between the outer sub-shaft and the inner sub-shaft in order to supply cooling fluid (28) to the shaft, wherein an outflow (42) is arranged in the radial direction between the outer sub-shaft and the inner sub-shaft in order to discharge the cooling fluid supplied to the shaft, wherein the outer sub-shaft encloses a fluid chamber (40) arranged in an axial direction between the inflow and the outflow, wherein the fluid chamber is configured for accommodating the cooling fluid in order to cool the shaft, wherein a flow direction of the cooling fluid in the fluid chamber is establishable by a delivery direction of a fluid pump (24)

wherein the outer sub-shaft (32) comprises a connecting section (38) for rotationally fixing the outer sub-shaft to the inner sub-shaft (30), and wherein the inflow (36) comprises one or more of a duct, a through-cut, and a bore hole in the connecting section.

2. The shaft (12) of claim 1, wherein the connecting section (38) comprises a driving toothing (46) to connect the inner sub-shaft (30) and the outer sub-shaft (32) in a rotationally fixed manner.

3. The shaft (12) of claim 1, wherein the outflow (42) is formed by a gap between the outer sub-shaft (32) and the inner sub-shaft (30).

4. The shaft (12) of claim 1, wherein the inner sub-shaft (30) comprises a support ridge (41) proximate the outflow (42), the support ridge (41) supporting the inner sub-shaft at the outer sub-shaft (32).

5. The shaft (12) of claim 1, wherein the outflow (42) opens into a feed line to a fluid sump (22).

6. The shaft (12) of claim 1, wherein an end section of the inner sub-shaft (30) protrudes axially farther than the outer sub-shaft (32) in order to form the output shaft of the electric machine (10).

7. The shaft (12) of claim 6, wherein the end section is configured to be connected to a mechanism and/or the end section forms a part of the mechanism.

8. The shaft (12) of claim 1, wherein the outer sub-shaft (32) is formed from two parts, and the two parts (32a, 32b) are connected in a fluid-tight manner with one or more of a press fit, a friction welding, and a bonding.

9. An electric machine (10) comprising:
a stator (16);
a rotor (14); and
a shaft (12) comprising an outer sub-shaft (32) and an inner sub-shaft (30), the outer sub-shaft (32) rotationally fixed to the rotor (14), the inner sub-shaft (30) rotationally fixed to the outer sub-shaft (32) and configured as an output shaft of the electric machine (10); and
a transmitter wheel (34) configured for rotating with the shaft (12), wherein an inflow (36) is arranged in a radial direction between the outer sub-shaft and the inner sub-shaft in order to supply cooling fluid (28) to the shaft, wherein an outflow (42) is arranged in the radial direction between the outer sub-shaft and the inner sub-shaft in order to discharge the cooling fluid supplied to the shaft, wherein the outer sub-shaft encloses a fluid chamber (40) arranged in an axial direction between the inflow and the outflow, wherein the fluid chamber is configured for accommodating the cooling fluid in order to cool the shaft, wherein a flow direction of the cooling fluid in the fluid chamber is establishable by a delivery direction of a fluid pump (24), and wherein the transmitter wheel comprises a bore hole to supply the cooling fluid to the shaft through the transmitter wheel.

10. The electric machine (10) of claim 9, wherein the outer sub-shaft (32) is rotationally fixed to the rotor (14) with a press fit.

11. The electric machine (10) of claim 9, further comprising a transmission (44) connected to the shaft (12), the outflow (42) configured for supplying the cooling fluid (28) to the transmission in order to lubricate and/or cool the transmission.

12. A system (20) for cooling the electric machine (10) of claim 9, comprising:
a fluid sump (22) for storing the cooling fluid (28); and
a fluid pump (24) for delivering the cooling fluid from the fluid sump to the electric machine in order to form a cooling circuit.

13. The system (20) of claim 12, further comprising a heat exchanger configured for rejecting heat from the cooling fluid (28), wherein the heat exchanger is arranged between the fluid sump (22) and the fluid pump (24) in the flow direction of the cooling fluid.

* * * * *